United States Patent [19]
Ozawa

[11] Patent Number: 4,699,474
[45] Date of Patent: Oct. 13, 1987

[54] COMPACT ZOOM LENS

[75] Inventor: Toshiro Ozawa, Kawasaki, Japan

[73] Assignee: Ricoh Company, Ltd., Tokyo, Japan

[21] Appl. No.: 761,095

[22] Filed: Jul. 31, 1985

[30] Foreign Application Priority Data

Jul. 31, 1984 [JP] Japan .................. 59-161265

[51] Int. Cl.⁴ .................. G02B 9/64; G02B 15/14
[52] U.S. Cl. .................. 350/427
[58] Field of Search .................. 350/427

[56] References Cited
U.S. PATENT DOCUMENTS
3,336,094 8/1967 Macher .................. 350/427

Primary Examiner—John K. Corbin
Assistant Examiner—Rebecca D. Gass
Attorney, Agent, or Firm—Oblon, Fisher, Spivak, McClelland & Maier

[57] ABSTRACT

A zoom lens for a color video camera in which zoom ratio is 6 and F number is approximately 1.4. The zoom lens comprises a positive first group for focusing, a negative second unit for zooming, a negative third unit which is a compensator, a positive fourth unit for forming an incident divergent bundle of rays into a parallel or converging bundle of rays, and a fifth unit in the form of a relay lens composed of a front component and a rear component. Parameters, especially such as a refracting power of the first unit and second unit, are suitably selected whereby a zoom lens which is compact and which aberrations are well compensated is obtained.

1 Claim, 25 Drawing Figures

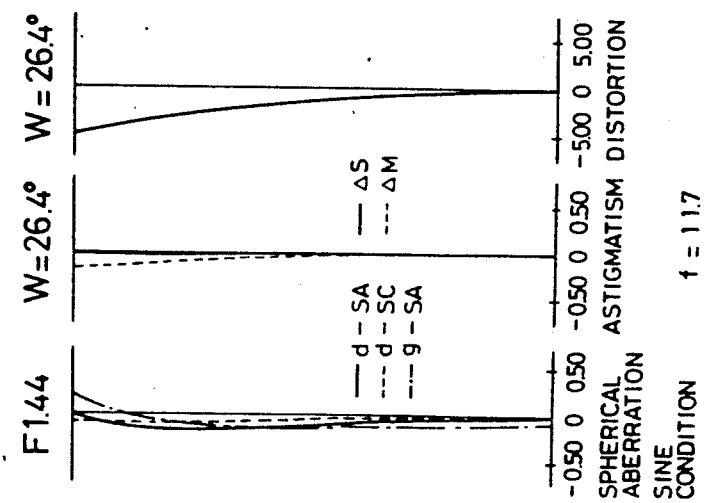
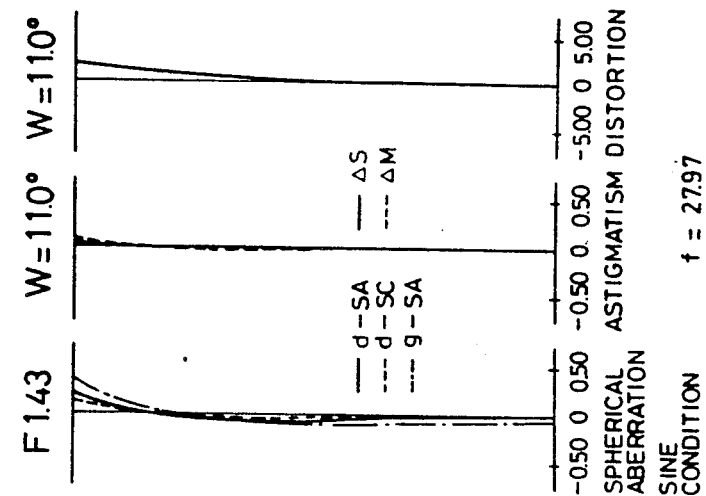
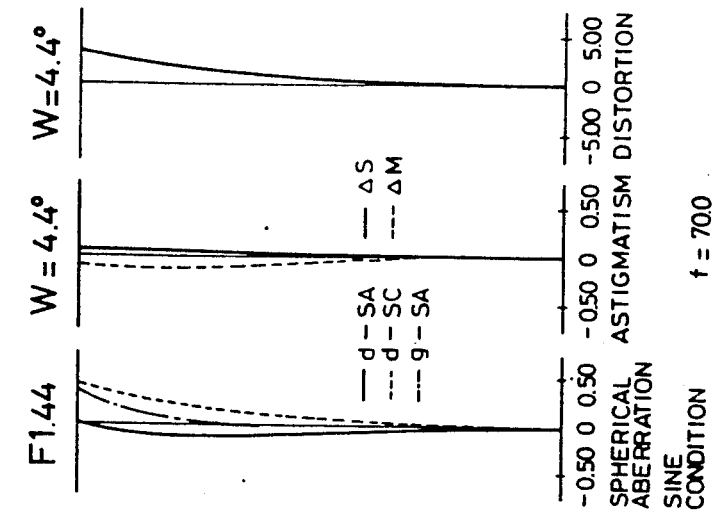

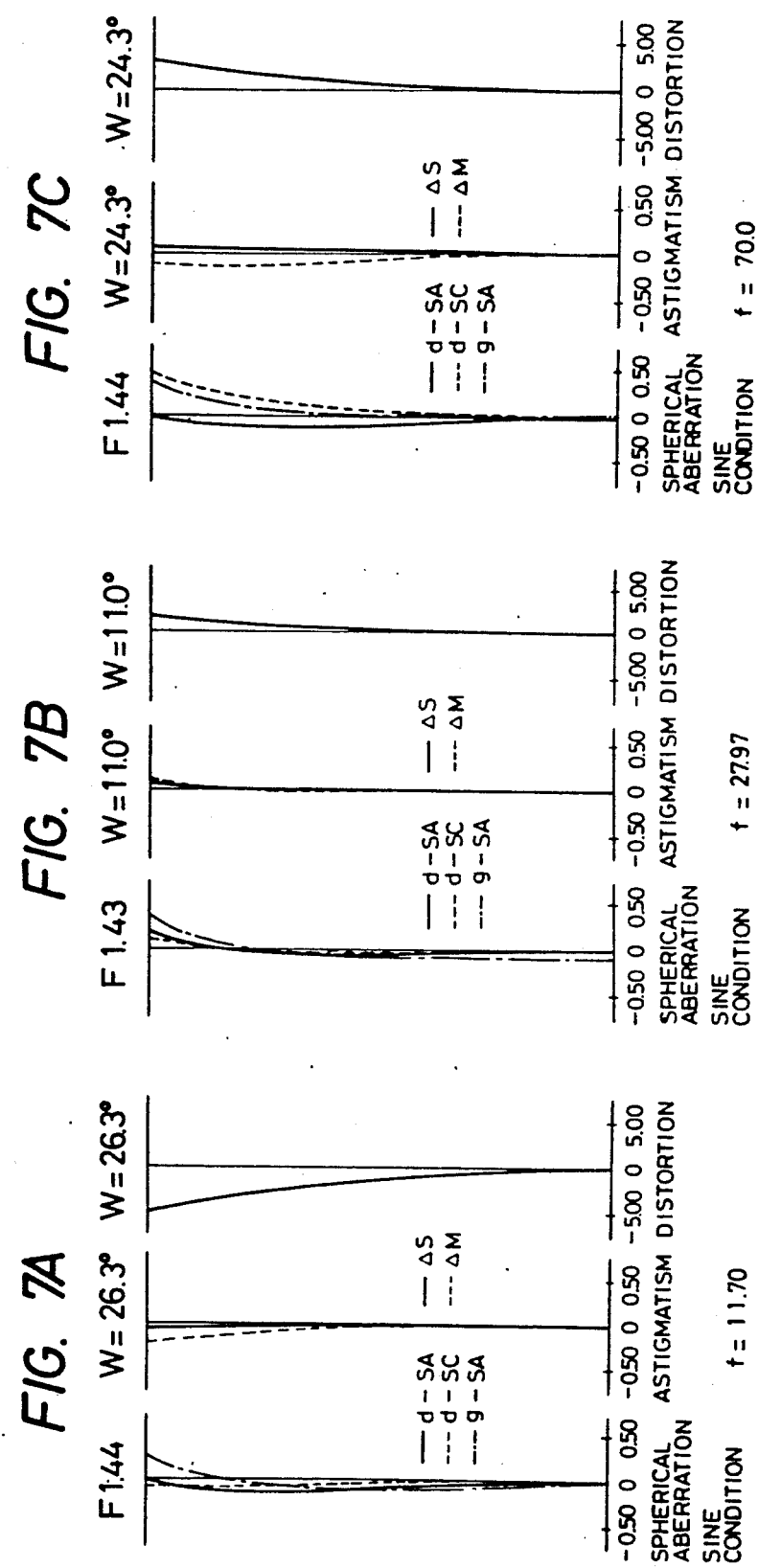

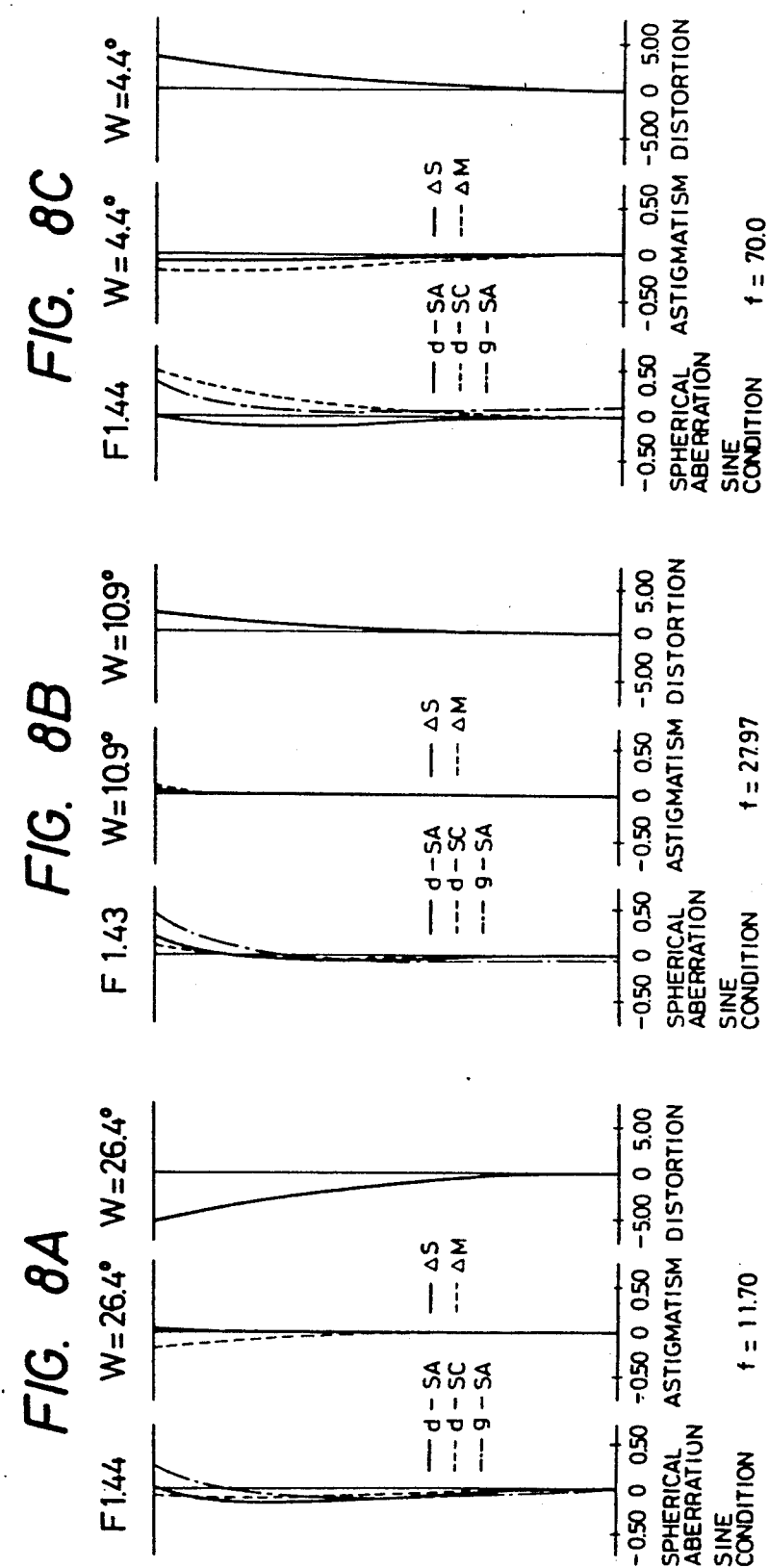

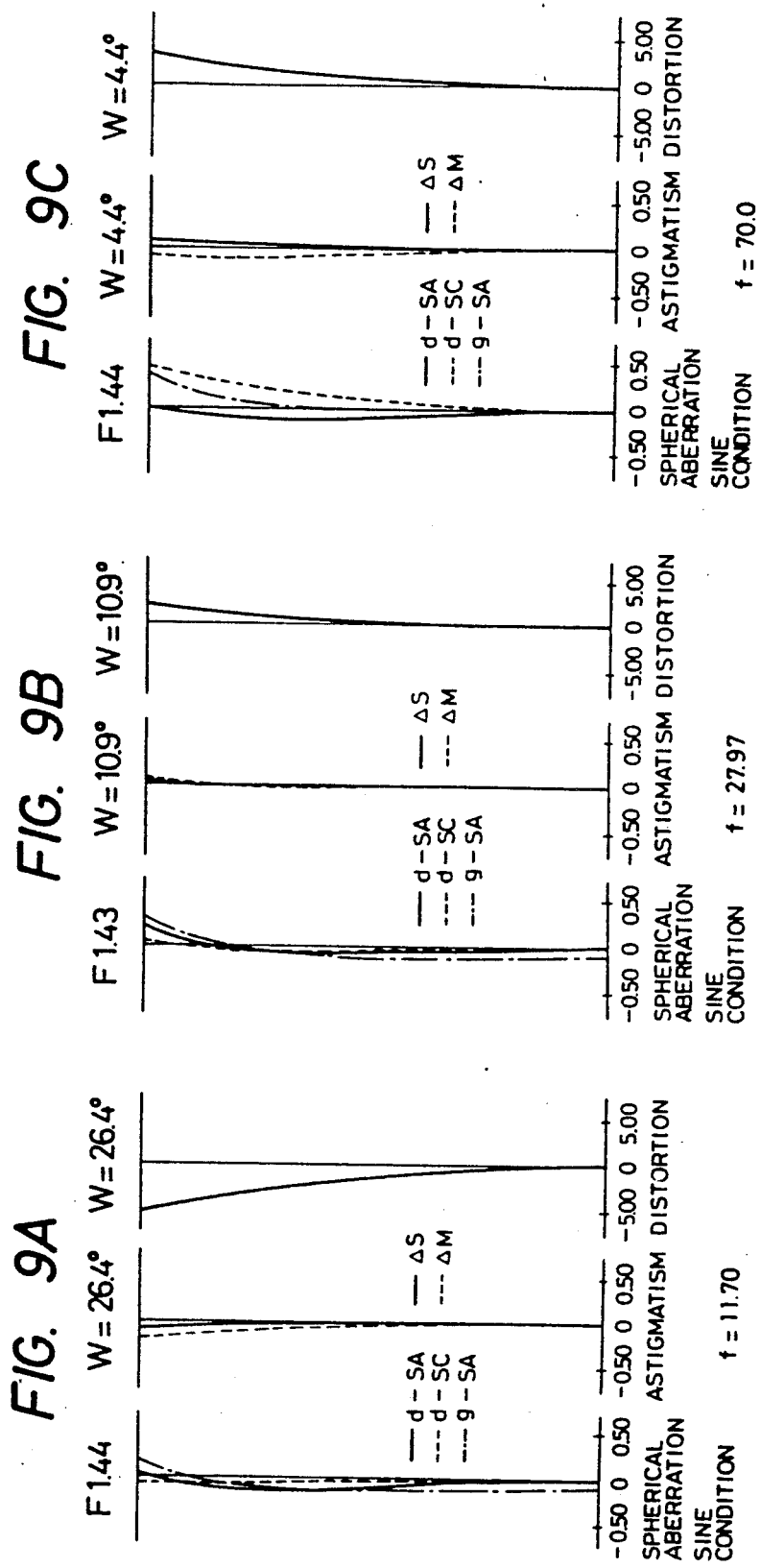

COMPACT ZOOM LENS

BACKGROUND OF THE INVENTION

1. Field of the Invention

This invention relates to a zoom lens having a large zoom ratio, which zoom ratio is 6 and F number is approximately 1.4, and having a large aperture, the zoom lens being compact, and particularly to a zoom lens suitable for a color video camera.

2. Description of the Prior Art

Generally, it has a tendency that a camera lens having a large aperture is demanded and the lens which is short in overall length of a lens and small in diameter is desired to provide compactness. Particularly, a lens for a video camera, in which an imaging element has a low sensitivity, is desired to have a large aperture.

However, when the lens is designed to have a large aperture, compensation of aberration is difficult to make, and therefore, in many cases, the refracting power of each unit of the zoom lens is made weak and the overall length of the lens is lenghtened. Conversely, even if the overall length of the lens should be shortened, a large aperture cannot be maintained over the whole zoom area or even if the large aperture can be maintained, a diameter of a front lens is apt to increase.

SUMMARY OF THE INVENTION

The present invention is intended to provide a zoom lens which is small in diameter of a front lens despite a large zoom ratio, i.e., a zoom ratio—6 and F number—approximately 1.4, as well as a large aperture, which is so compact that overall length of lens is 1.72 times that of the longest focal length (so-called tele-ratio is 1.72), and in which aberrations are well compensated.

In accordance with the present invention, there is provided a zoom lens comprising, successively from an object side, a first lens unit having a positive refracting power, a second lens unit having a negative refracting power, a third lens unit having a negative refracting power, a fourth lens unit having a positive refracting power, and a fifth lens unit having a positive refracting power with a stop sandwiched therebetween, as shown in FIG. 1, said first lens group comprising a lens unit for focusing consisting of a cemented lens of a first negative lens and a second positive lens and a third positive meniscus lens, said second lens unit comprising a lens group consisting of a fourth negative lens and a cemented lens of a fifth negative lens and a sixth positive lens, said lens unit being moved as zooming takes place to vary a focal length, said third lens unit comprising a lens group consisting of seventh negative lens for principally maintaining a focal position constant by movement thereof as zooming takes place;

said fourth lens unit comprising a lens group consisting of two positive eighth and ninth lenses for compensating a divergent luminuous flux emitted from a zoom system composed of said first, second and third units into a bundle of rays or a gently converging luminous flux, said fifth lens unit comprising a lens group for focusing comprising a front component consisting of a positive tenth lens, a positive eleventh meniscus lens and a negative twelfth lens and a rear component consisting of a negative thirteenth lens, a positive fourteenth lens and a positive meniscus fifteenth lens, said zoom lens being satisfied with the following conditions:

$$4.2 F_w < F_I < 4.9 F_w \quad (1)$$
$$3.4 < F_I/|F_{II}| < 4.0 \quad (2)$$
$$0.98 < |F_{II}| \left( \frac{n_4 - 1}{r_7} + \frac{n_5 - 1}{|r_8|} \right) < 1.15 \quad (3)$$
$$2.45 F_w < F_V < 2.85 F_w \quad (4)$$
$$1.6 F_V < f_1 < 2.2 F_V \quad (5)$$
$$0.14 f_1 < d_{22} < 0.2 f_1 \quad (6)$$
$$\frac{n_8 + n_9}{2} < 1.7 \quad (7)$$
$$1.75 < n_{12} \quad (8)$$
$$55 < \frac{v_8 + v_9}{2} \quad (9)$$
$$v_{12} < 27 \quad (10)$$

where $F_w$: Shortest focal length of the entire system
$F_I$: Focal length of the first lens unit
$F_{II}$: Focal length of the second lens unit
$F_V$: Focal length of the fifth lens unit
$r_7$: Radius of curvature of a surface on the image side of the fourth lens
$r_8$: Radius of curvature of a surface on the object side of the fifth lens
$n_i$: Refractive index of the i lens
$v_i$: Abbe's number of the i lens
$f_1$: Focal length of the front component of the fifth lens unit
$d_{22}$: Spacing between the negative 12th lens and the negative 13th lens Generally, in the zoom lens of the type disclosed in the present invention, strengthening of the refracting power of the lens group, particularly, of the first and second units, advantageously contributes to compactness of the lens. However, if the lens units are excessively strengthened, aberrations greatly occur and the construction of the groups becomes complicated to compensate therefor, conversely resulting in an increase in overall length of the lens. Thus, it is important that an adequate refracting power is imparted to the first lens unit and the second lens unit.

The above-described conditions (1) and (2) are necessary to make the zoom portion compact and to restrain various aberrations occurring in the first and second lens units to a suitable range.

When a value exceeds the lower limit of the condition (1), various aberrations occuring in the first lens unit increase, and particularly, when an attempt is made to having a large zoom ratio and a large aperture to a degree that of the embodiment according to the present invention, compensation of a spherical aberration and a chromatic aberration in the neighborhood of the longest focal length is difficult to make. Conversely, when the value exceeds the upper limit, compensation of various aberrations is advantageously made but when an attempt is made to move the first lens unit so that shortest focal length capable of being focused is sufficiently shortened, the diameter of a front lens increases, resulting in a contradiction to the object of compactness.

The strong refracting power of the second lens unit is advantageous in that the length of the zoom portion is shortened to decrease an eclipse of the marginal luminous flux on the side of the short focal point. However, when the refracting power of the second lens unit is strengthened to a degree exceeding that of the condition (2), a variation in various aberrations increases as zooming takes place, and particularly, a negative spherical aberration occuring in the first lens unit on the side of the long focal point becomes over-compensated in the second lens unit, failing to attain good compensation of aberrations. Conversely, when the value exceeds the lower limit, it is difficult to decrease a tele-ratio to a value less than 1.72.

The condition (30) is provided to determine a refracting power of an air lens in the second lens unit. When a value exceeds the upper limit, a positive spherical aberration occurring in the second lens unit increases, and particularly, a spherical aberration on the side of the long focal point not only becomes over-compensated but a variation in chromatic aberration of magnification as zooming takes place increases, as a consequence of which it is difficult to select other conditions of the lens construction to effect compensation of aberrations. When the value exceeds the lower limit, when focusing is effected in the first lens unit, a spherical aberration on the side of the long focal point is extremely short in compensation, resulting in a difficulty in maintaining a good state of aberration compensation.

In order to obtain a lens which is extremely short in overall length of lens with a tele-ratio of less than 1.72, it is necessary not only to reduce the length of the lens portion but to shorten back-focus. It is effective for shortening the back-focus to strengthen the refracting power of the fifth lens unit. Also, where the fifth lens unit is composed of the front component and rear component having a positive refracting power, the back-focus can be shortened by strengthening the refracting power of the front component as much as possible so that the front and rear components are arranged apart from each other. To this end, the upper limit of the condition (4), the upper limit of the condition (5) and the lower limit of the condition (6) are provided, and when the value exceeds the aforesaid limits, it is difficult to realize the tele-ratio of 1.72 or less.

However, when the refracting power of the fifth lens is strengthened to a degree exceeding the lower limit of the condition (4), a spherical aberration, a chromatic aberration, an astigmatism or the like occurs, resulting in a difficulty in compensation. Similarly, when the refracting power of the front component of the fifth lens unit to a degree exceeding the lower limit of the condition (5), the spherical aberration in the neighbourhood of the shortest focal length is short in compensation. Further, the upper limit of the condition (6) is necessary to prevent the length of the fifth lens unit from being increased. That is, if the length or distance of the front component and rear component of the fifth lens unit is extended, it is advantageous to shorten the back-focus, whereas the length of the fifth lens unit increases, and it is not only disadvantageous to shorten the overall length of the lens but the quantity of marginal light is short. When an effective diameter of the lens is made large to compensate for a shortage of the quantity of marginal light, a coma flare increases, resulting in a failure of aberration compensation.

The conditions (7) and (8) are conditions required, where the overall length of the lens is shortened, for improvement of Petzval's sum which is liable to be deteriorated.

The conditions (9) and (10) are conditions required to keep in a good condition compensation of a chromatic aberration on the side of the short focal point.

BRIEF DESCRIPTION OF THE DRAWINGS

FIGS. 2A–2C through 9A–9C are aberration curves of embodiments 1 through 8, respectively, curves (a), (b) and (c) showing the cases of the shortest, intermediate and longest focal lengths, respectively.

DETAILED DESCRIPTION OF THE PREFERRED EMBODIMENTS

Figure 1:
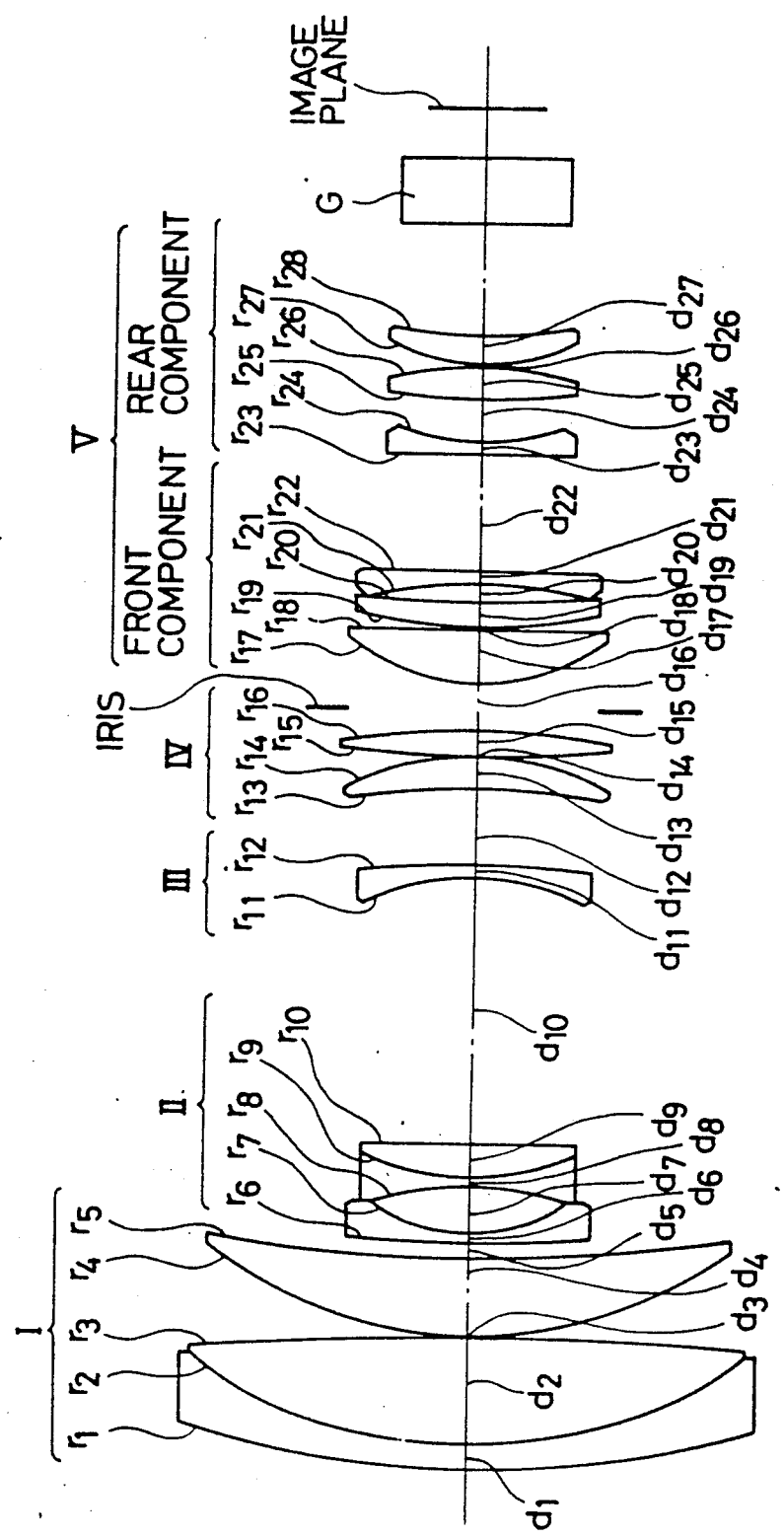
FIG. 1 is a sectional view showing a construction of a lens in a first embodiment of a zoom lens according to the present invention.

In the following, the embodiments of the present invention will be shown. In the following tables, reference characters f designates a focal length, r a radius of curvature of a lens surface, d a spacing between lens surfaces, n a refractive index of line d of a lens, $\nu$ Abbe's number of a lens, and a tele-ratio being a value in the case where an optical compensation glass G having thickness 6 mm, n=1.51680 and $\nu$=64.2, is inserted.

| Embodiment 1 | | | |
|---|---|---|---|
| f = 12.0–72.0 $F_{NO}$ = 1.4 | | | |
| r | d | n | $\nu$ |
| 1 | 87.000 | 2.00 | 1.80518 | 25.5 |
| 2 | 41.532 | 10.05 | 1.58913 | 61.3 |
| 3 | −247.078 | 0.20 | | |
| 4 | 35.919 | 7.65 | 1.58913 | 61.3 |
| 5 | 151.701 | variable | | |
| 6 | 159.128 | 0.95 | 1.75500 | 52.3 |
| 7 | 15.375 | 4.38 | | |
| 8 | −26.890 | 0.80 | 1.69680 | 55.5 |
| 9 | 19.555 | 3.35 | 1.80518 | 25.5 |
| 10 | 5725.713 | variable | | |
| 11 | −20.768 | 0.90 | 1.58913 | 61.3 |
| 12 | −102.415 | variable | | |
| 13 | −109.607 | 2.85 | 1.58913 | 61.3 |
| 14 | −27.681 | 0.11 | | |
| 15 | 88.731 | 2.40 | 1.58913 | 61.3 |
| 16 | −83.490 | 4.13 | | |
| 17 | 21.873 | 4.40 | 1.51680 | 64.2 |
| 18 | −594.145 | 0.50 | | |
| 19 | 49.557 | 2.40 | 1.51680 | 64.2 |
| 20 | 131.490 | 1.51 | | |
| 21 | −52.639 | 1.34 | 1.80518 | 25.5 |
| 22 | 393.691 | 11.17 | | |
| 23 | 244.135 | 1.12 | 1.80518 | 25.5 |
| 24 | 19.504 | 3.33 | | |
| 25 | 43.509 | 2.80 | 1.69680 | 55.5 |
| 26 | −29.494 | 0.12 | | |
| 27 | 16.563 | 2.40 | 1.69680 | 55.5 |
| 28 | 30.605 | | | |
| f | 12.0 | 28.73 | 72.0 |
| $d_5$ | 1.114 | 16.256 | 25.591 |
| $d_{10}$ | 23.638 | 6.655 | 5.092 |
| $d_{12}$ | 7.110 | 8.950 | 1.179 |

$F_I = 4.42 \, F_w$
$F_I / |F_{II}| = 3.63$ $$|F_{II}| \left( \frac{n_4 - 1}{r_7} + \frac{n_5 - 1}{|r_8|} \right) = 1.095$$

$F_V = 2.63 \, F_w$
$f_1 = 1.93 \, F_V$
$d_{22} = 0.18 \, f_1$
Tele-ratio = 1.70

| Embodiment 2 | | | | |
|---|---|---|---|---|
| $f = 12.0-7.2$ $F_{NO} = 1.4$ | | | | |
|  | r | d | n | ν |
| 1 | 89.746 | 2.00 | 1.80518 | 25.5 |
| 2 | 41.295 | 9.80 | 1.62041 | 60.3 |
| 3 | −336.045 | 0.20 | | |
| 4 | 37.306 | 7.30 | 1.62041 | 60.3 |
| 5 | 156.965 | variable | | |
| 6 | 153.438 | 0.90 | 1.75500 | 52.3 |
| 7 | 15.429 | 4.43 | | |
| 8 | −27.502 | 0.75 | 1.71300 | 53.9 |
| 9 | 20.910 | 3.20 | 1.84666 | 23.8 |
| 10 | 1064.952 | variable | | |
| 11 | −20.479 | 0.90 | 1.58913 | 61.3 |
| 12 | −110.815 | variable | | |
| 13 | −65.467 | 2.70 | 1.58913 | 61.3 |
| 14 | −26.181 | 0.10 | | |
| 15 | 115.874 | 2.60 | 1.58913 | 61.3 |
| 16 | −55.621 | 4.24 | | |
| 17 | 20.258 | 4.65 | 1.51680 | 64.2 |
| 18 | −1102.880 | 0.30 | | |
| 19 | 50.005 | 2.20 | 1.51680 | 64.2 |
| 20 | 114.826 | 1.43 | | |
| 21 | −53.430 | 1.05 | 1.80518 | 25.5 |
| 22 | 525.952 | 10.50 | | |
| 23 | 730.603 | 1.10 | 1.80518 | 25.5 |
| 24 | 19.662 | 3.90 | | |
| 25 | 60.358 | 3.00 | 1.71300 | 53.9 |
| 26 | −29.220 | 0.12 | | |
| 27 | 17.401 | 2.50 | 1.71300 | 53.9 |
| 28 | 39.957 | | | |

| f | 12.0 | 28.73 | 72.0 |
|---|---|---|---|
| $d_5$ | 1.158 | 16.349 | 25.709 |
| $d_{10}$ | 24.270 | 7.396 | 5.442 |
| $d_{12}$ | 7.086 | 8.768 | 1.363 |

$F_I = 4.41 F_w$
$F_I/|F_{II}| = 3.60$ $$|F_{II}|\left(\frac{n_4 - 1}{r_7} + \frac{n_5 - 1}{|r_8|}\right) = 1.100$$

$F_V = 2.68 F_w$
$f_1 = 1.73 F_V$
$d_{22} = 0.19 f_1$
Tele-ratio = 1.70

| Embodiment 3 | | | | |
|---|---|---|---|---|
| $f = 12.0-72.0$ $F_{NO} = 1.4$ | | | | |
|  | r | d | n | ν |
| 1 | 91.554 | 2.00 | 1.80518 | 25.5 |
| 2 | 42.037 | 9.92 | 1.58913 | 61.3 |
| 3 | −252.835 | 0.20 | | |
| 4 | 36.726 | 7.60 | 1.62041 | 60.3 |
| 5 | 156.819 | variable | | |
| 6 | 201.467 | 0.95 | 1.69680 | 55.5 |
| 7 | 15.045 | 4.40 | | |
| 8 | −29.076 | 0.80 | 1.69680 | 55.5 |
| 9 | 18.313 | 3.30 | 1.80518 | 25.5 |
| 10 | 281.742 | variable | | |
| 11 | −20.960 | 0.90 | 1.58913 | 61.3 |
| 12 | −116.907 | variable | | |
| 13 | −154.313 | 3.00 | 1.58913 | 61.3 |
| 14 | −27.872 | 0.15 | | |
| 15 | 89.991 | 2.30 | 1.58913 | 61.3 |
| 16 | −106.526 | 4.05 | | |
| 17 | 21.799 | 4.35 | 1.51680 | 64.2 |
| 18 | −863.583 | 0.40 | | |
| 19 | 48.323 | 2.20 | 1.51680 | 64.2 |
| 20 | 133.443 | 1.50 | | |
| 21 | −52.370 | 1.24 | 1.80518 | 25.5 |
| 22 | 418.104 | 11.11 | | |
| 23 | 202.190 | 1.10 | 1.80518 | 25.5 |
| 24 | 19.487 | 3.31 | | |
| 25 | 43.534 | 2.80 | 1.69680 | 55.5 |
| 26 | −28.974 | 0.12 | | |
| 27 | 16.557 | 2.40 | 1.69680 | 55.5 |
| 28 | 29.168 | | | |

| f | 12.0 | 28.73 | 72.0 |
|---|---|---|---|
| $d_5$ | 1.363 | 16.457 | 25.740 |
| $d_{10}$ | 23.598 | 6.871 | 5.456 |
| $d_{12}$ | 7.363 | 8.997 | 1.129 |

$F_I = 4.42 F_w$
$F_I/|F_{II}| = 3.59$ $$|F_{II}|\left(\frac{n_4 - 1}{r_7} + \frac{n_5 - 1}{|r_8|}\right) = 1.037$$

$F_V = 2.60 F_w$
$f_1 = 1.93 f_V$
$d_{22} = 0.18 f_1$
Tele-ratio = 1.70

| Embodiment 4 | | | | |
|---|---|---|---|---|
| $f = 12.0-72.0$ $F_{NO} = 1.4$ | | | | |
|  | r | d | n | ν |
| 1 | 88.070 | 2.00 | 1.80518 | 25.5 |
| 2 | 41.840 | 9.90 | 1.58913 | 61.3 |
| 3 | −258.048 | 0.20 | | |
| 4 | 36.332 | 7.70 | 1.58913 | 61.3 |
| 5 | 159.610 | variable | | |
| 6 | 201.972 | 0.95 | 1.75500 | 52.3 |
| 7 | 16.024 | 4.30 | | |
| 8 | −29.861 | 0.80 | 1.69680 | 55.5 |
| 9 | 19.232 | 3.30 | 1.80518 | 25.5 |
| 10 | 351.175 | variable | | |
| 11 | −19.742 | 0.90 | 1.51680 | 64.2 |
| 12 | −164.566 | variable | | |
| 13 | −128.696 | 3.10 | 1.69680 | 55.5 |
| 14 | −27.758 | 0.10 | | |
| 15 | 88.423 | 2.70 | 1.58913 | 61.3 |
| 16 | −205.483 | 3.71 | | |
| 17 | 21.235 | 4.60 | 1.51680 | 64.2 |
| 18 | −53253.093 | 0.30 | | |
| 19 | 46.946 | 2.20 | 1.51680 | 64.2 |
| 20 | 122.227 | 1.60 | | |
| 21 | −51.893 | 1.05 | 1.80518 | 25.5 |
| 22 | 385.111 | 11.10 | | |
| 23 | 211.881 | 1.10 | 1.80518 | 25.5 |
| 24 | 19.520 | 3.30 | | |
| 25 | 44.027 | 2.80 | 1.69680 | 55.5 |
| 26 | −28.418 | 0.12 | | |
| 27 | 16.457 | 2.40 | 1.69680 | 55.5 |
| 28 | 29.254 | | | |

| f | 12.0 | 28.73 | 72.0 |
|---|---|---|---|
| $d_5$ | 1.236 | 16.490 | 25.895 |
| $d_{10}$ | 23.637 | 6.735 | 5.216 |
| $d_{12}$ | 7.423 | 9.071 | 1.185 |

$F_I = 4.46 F_w$
$F_I/|F_{II}| = 3.59$ $$|F_{II}|\left(\frac{n_4 - 1}{r_7} + \frac{n_5 - 1}{|r_8|}\right) = 1.050$$

$F_V = 2.49 F_w$
$f_1 = 1.96 F_V$
$d_{22} = 0.18 f_1$
Tele-ratio = 1.70

| Embodiment 5 | | | | |
|---|---|---|---|---|
| $f = 11.7-70$ $F_{NO} = 1.4$ | | | | |
|  | r | d | n | ν |

-continued

Embodiment 5

| | | | | |
|---|---|---|---|---|
| 1 | 87.306 | 2.00 | 1.80518 | 25.5 |
| 2 | 41.476 | 9.50 | 1.58913 | 61.3 |
| 3 | −263.894 | 0.20 | | |
| 4 | 36.012 | 7.13 | 1.58913 | 61.3 |
| 5 | 152.692 | variable | | |
| 6 | 114.316 | 0.90 | 1.69680 | 55.5 |
| 7 | 14.623 | 4.38 | | |
| 8 | −25.070 | 0.75 | 1.71300 | 53.9 |
| 9 | 18.793 | 3.10 | 1.80518 | 25.5 |
| 10 | 393.796 | variable | | |
| 11 | −18.938 | 0.90 | 1.51680 | 64.2 |
| 12 | −83.031 | variable | | |
| 13 | −76.108 | 2.65 | 1.58913 | 61.3 |
| 14 | −25.077 | 0.10 | | |
| 15 | 68.383 | 3.00 | 1.51680 | 64.2 |
| 16 | −63.516 | 3.52 | | |
| 17 | 20.716 | 4.35 | 1.51680 | 64.2 |
| 18 | 16099.513 | 0.32 | | |
| 19 | 47.542 | 2.20 | 1.51680 | 64.2 |
| 20 | 92.715 | 1.52 | | |
| 21 | −52.026 | 1.10 | 1.80518 | 25.5 |
| 22 | 452.179 | 10.35 | | |
| 23 | 5545.522 | 1.03 | 1.80518 | 25.5 |
| 24 | 19.999 | 2.99 | | |
| 25 | 47.672 | 2.85 | 1.71300 | 53.9 |
| 26 | −27.883 | 0.12 | | |
| 27 | 17.299 | 2.36 | 1.71300 | 53.9 |
| 28 | 33.033 | | | |

| f | 11.70 | 27.97 | 70.0 |
|---|---|---|---|
| $d_5$ | 1.179 | 16.620 | 26.246 |
| $d_{10}$ | 25.878 | 7.634 | 4.812 |
| $d_{12}$ | 5.314 | 8.116 | 1.313 |

$F_I = 4.58 F_w$
$F_I / |F_{II}| = 3.84$ $$|F_{II}| \left( \frac{n_4 - 1}{r_7} + \frac{n_5 - 1}{|r_8|} \right) = 1.061$$

$F_V = 2.69 F_w$
$f_1 = 2.00 F_V$
$d_{22} = 0.16 f_1$
Tele-ratio = 1.70

Embodiment 6 f = 11.70–70.0   $F_{NO}$ = 1.4

| | r | d | n | ν |
|---|---|---|---|---|
| 1 | 91.324 | 2.0 | 1.80518 | 25.5 |
| 2 | 41.801 | 9.45 | 1.58193 | 61.3 |
| 3 | −276.680 | 0.20 | | |
| 4 | 36.514 | 7.23 | 1.62041 | 60.3 |
| 5 | 152.339 | variable | | |
| 6 | 104.245 | 0.90 | 1.69680 | 55.5 |
| 7 | 14.363 | 4.46 | | |
| 8 | −24.914 | 0.80 | 1.71300 | 53.9 |
| 9 | 20.873 | 3.00 | 1.84666 | 23.8 |
| 10 | 264.523 | variable | | |
| 11 | −18.080 | 0.92 | 1.51680 | 64.2 |
| 12 | −68.102 | variable | | |
| 13 | −71.861 | 2.65 | 1.69680 | 55.5 |
| 14 | −26.171 | 0.25 | | |
| 15 | 83.417 | 2.80 | 1.51680 | 64.2 |
| 16 | −61.319 | 3.80 | | |
| 17 | 20.681 | 4.35 | 1.51680 | 64.2 |
| 18 | −2379.805 | 0.35 | | |
| 19 | 48.330 | 2.20 | 1.51680 | 64.2 |
| 20 | 85.543 | 1.60 | | |
| 21 | −52.293 | 1.10 | 1.84666 | 23.8 |
| 22 | 514.809 | 10.13 | | |
| 23 | −16939.679 | 1.10 | 1.80518 | 25.5 |
| 24 | 20.318 | 2.90 | | |
| 25 | 45.662 | 2.85 | 1.71300 | 53.9 |
| 26 | −27.442 | 0.12 | | |
| 27 | 17.532 | 2.30 | 1.69680 | 55.5 |
| 28 | 33.218 | | | |

| f | 11.70 | 27.97 | 70.0 |
|---|---|---|---|
| $d_5$ | 1.198 | 16.675 | 26.328 |
| $d_{10}$ | 26.102 | 7.744 | 4.783 |
| $d_{12}$ | 5.054 | 7.934 | 1.243 |

$F_I = 4.58 F_w$
$F_I / |F_{II}| = 3.86$ $$|F_{II}| \left( \frac{n_4 - 1}{r_7} + \frac{n_5 - 1}{|r_8|} \right) = 1.072$$

$F_V = 2.70 F_w$
$f_1 = 2.09 F_V$
$d_{22} = 0.15 f_1$
Tele-ratio = 1.71

Embodiment 7 f = 11.7–70.0   $F_{NO}$ = 1.4

| | r | d | n | ν |
|---|---|---|---|---|
| 1 | 95.969 | 2.00 | 1.80518 | 25.5 |
| 2 | 42.137 | 9.50 | 1.58913 | 61.3 |
| 3 | −236.278 | 0.20 | | |
| 4 | 36.430 | 7.24 | 1.62041 | 60.3 |
| 5 | 153.403 | variable | | |
| 6 | 130.783 | 0.90 | 1.69680 | 55.5 |
| 7 | 14.512 | 4.30 | | |
| 8 | −24.715 | 0.80 | 1.71300 | 53.9 |
| 9 | 18.148 | 3.15 | 1.80518 | 25.5 |
| 10 | 708.241 | variable | | |
| 11 | −19.249 | 0.95 | 1.51680 | 64.2 |
| 12 | −87.813 | variable | | |
| 13 | −89.944 | 2.70 | 1.69680 | 55.5 |
| 14 | −26.622 | 0.20 | | |
| 15 | 80.900 | 2.55 | 1.51680 | 64.2 |
| 16 | −93.800 | 4.21 | | |
| 17 | 20.849 | 4.35 | 1.51680 | 64.2 |
| 18 | −525.358 | 0.30 | | |
| 19 | 43.451 | 2.30 | 1.51680 | 64.2 |
| 20 | 97.437 | 1.55 | | |
| 21 | −52.369 | 1.10 | 1.84666 | 23.8 |
| 22 | 860.979 | 10.10 | | |
| 23 | −629.382 | 1.03 | 1.80518 | 25.5 |
| 24 | 20.264 | 2.95 | | |
| 25 | 48.438 | 2.80 | 1.69680 | 55.5 |
| 26 | −2.940 | 0.15 | | |
| 27 | 18.516 | 2.23 | 1.69680 | 55.5 |
| 28 | 41.719 | | | |

| f | 11.70 | 27.97 | 70.00 |
|---|---|---|---|
| $d_5$ | 1.102 | 16.661 | 26.364 |
| $d_{10}$ | 26.295 | 7.823 | 4.649 |
| $d_{12}$ | 4.838 | 7.752 | 1.223 |

$F_I = 4.56 F_w$
$F_I / |F_{II}| = 3.84$ $$|F_{II}| \left( \frac{n_4 - 1}{r_7} + \frac{n_5 - 1}{|r_8|} \right) = 1.068$$

$F_V = 2.69 F_w$
$f_1 = 1.76 F_V$
$d_{22} = 0.18 f_1$
Tele-ratio = 1.71

Embodiment 8 f = 11.7–70.0   $F_{NO}$ = 1.4

| | r | d | n | ν |
|---|---|---|---|---|
| 1 | 91.892 | 2.00 | 1.80518 | 25.5 |
| 2 | 42.451 | 9.50 | 1.58913 | 61.3 |

-continued

Embodiment 8

| | | | | |
|---|---|---|---|---|
| 3 | −238.445 | 0.20 | | |
| 4 | 36.485 | 7.24 | 1.58913 | 61.3 |
| 5 | 151.406 | variable | | |
| 6 | 99.396 | 0.90 | 1.69680 | 55.5 |
| 7 | 14.933 | 4.55 | | |
| 8 | −24.269 | 0.80 | 1.69680 | 55.5 |
| 9 | 19.890 | 3.20 | 1.80518 | 25.5 |
| 10 | 249.966 | variable | | |
| 11 | −20.788 | 0.95 | 1.48749 | 70.4 |
| 12 | −157.715 | variable | | |
| 13 | −219.488 | 2.90 | 1.58913 | 61.3 |
| 14 | −26.578 | 0.10 | | |
| 15 | 79.647 | 2.25 | 1.58913 | 61.3 |
| 16 | −162.082 | 3.43 | | |
| 17 | 21.365 | 4.35 | 1.58913 | 61.3 |
| 18 | −2006.826 | 0.30 | | |
| 19 | 46.053 | 2.30 | 1.51680 | 64.2 |
| 20 | 74.384 | 1.67 | | |
| 21 | −51.211 | 1.28 | 1.80518 | 25.5 |
| 22 | 359.565 | 10.10 | | |
| 23 | −280.177 | 1.03 | 1.80518 | 25.5 |
| 24 | 19.987 | 2.95 | | |
| 25 | 47.128 | 2.80 | 1.69680 | 55.5 |
| 26 | −27.014 | 0.15 | | |
| 27 | 17.691 | 2.23 | 1.69680 | 55.5 |
| 28 | 43.155 | | | |

| f | 11.70 | 27.97 | 70.0 |
|---|---|---|---|
| $d_5$ | 1.192 | 16.901 | 26.686 |
| $d_{10}$ | 26.433 | 7.757 | 4.842 |
| $d_{12}$ | 5.078 | 8.044 | 1.174 |

$F_I = 4.66 F_w$
$F_I/|F_{II}| = 3.87$ $$|F_{II}|\left(\frac{n_4 - 1}{r_7} + \frac{n_5 - 1}{|r_8|}\right) = 1.063$$

$F_V = 2.63 F_w$
$f_1 = 1.83 F_V$
$d_{22} = 0.18 f_1$
Tele-ratio = 1.70

Figure 2A:
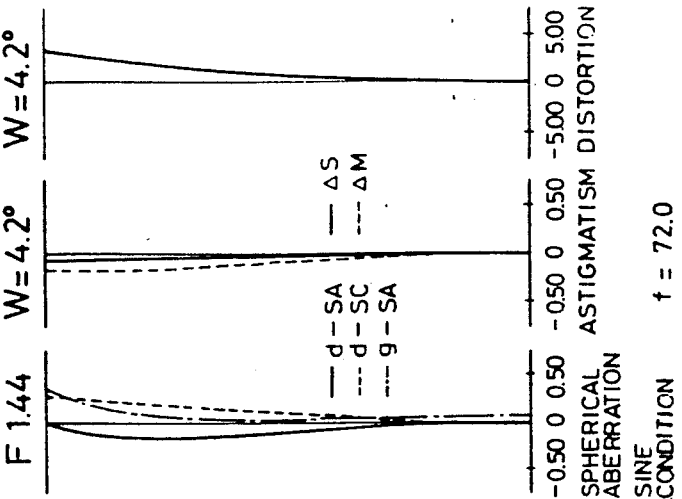
Figure 2B:
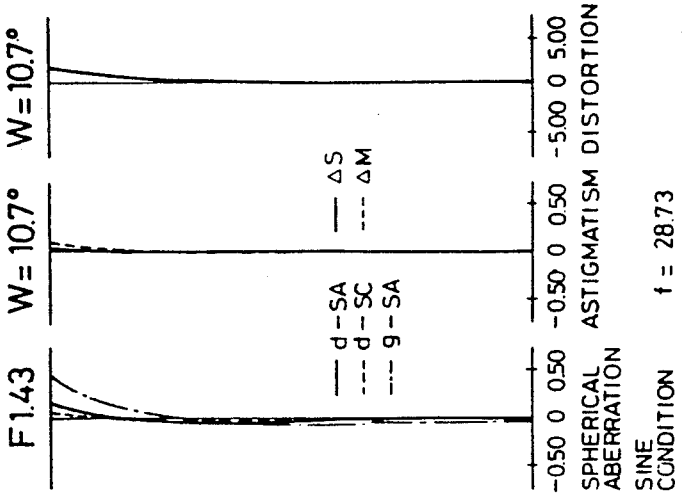
Figure 2C:
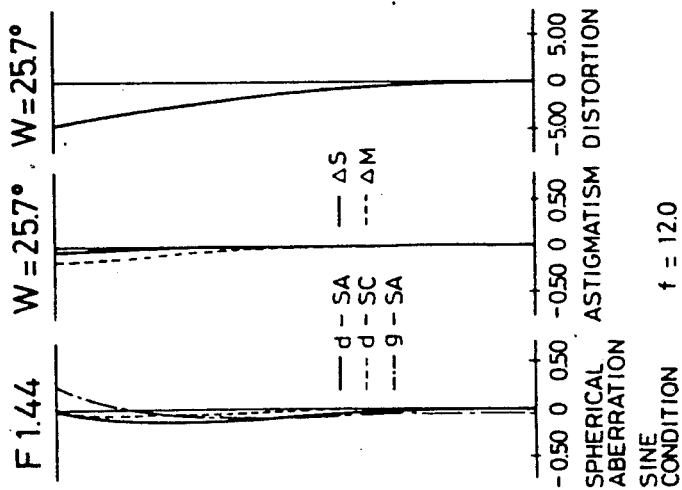
Figure 3A:
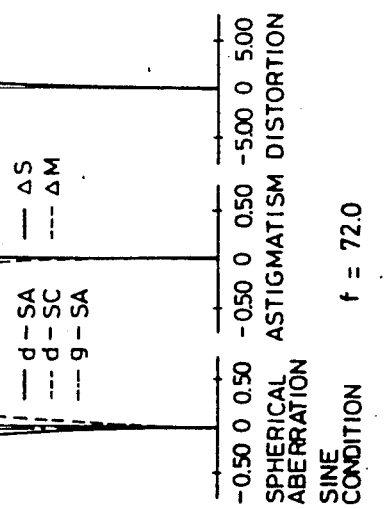
Figure 3B:
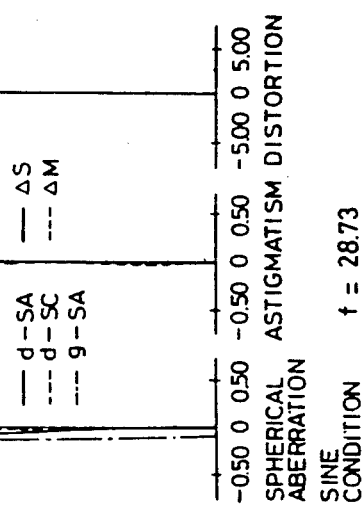
Figure 3C:
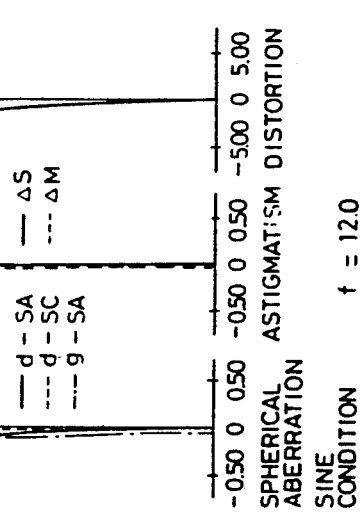
Figure 4A:
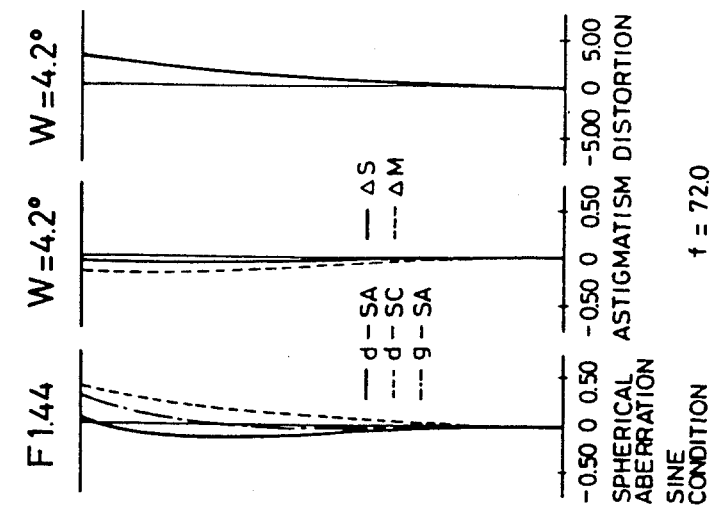
Figure 4B:
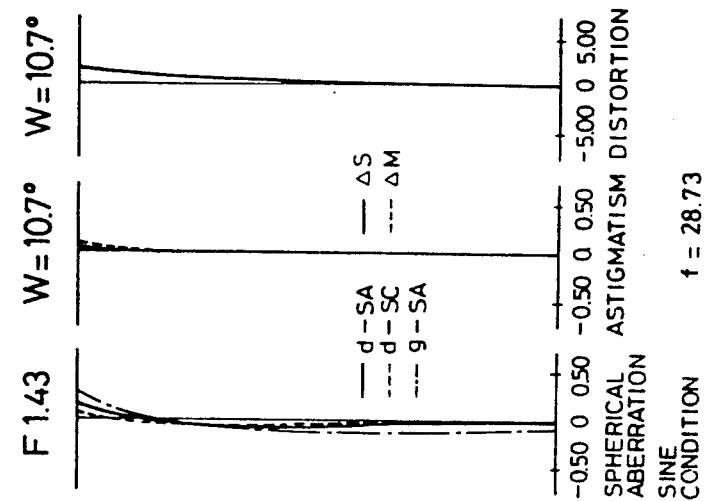
Figure 4C:
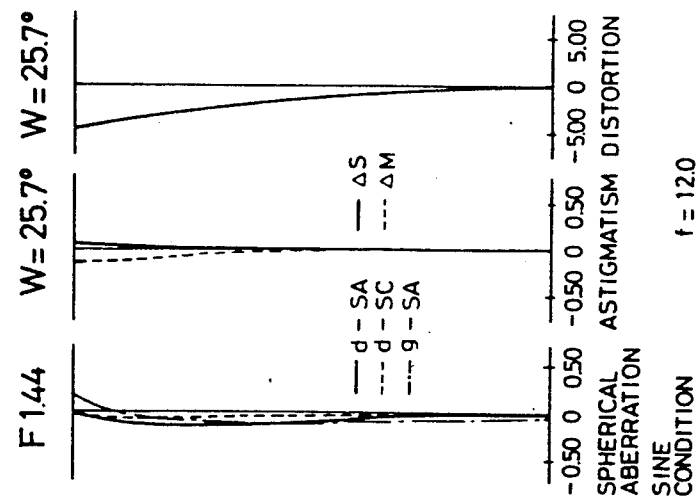
Figure 5A:
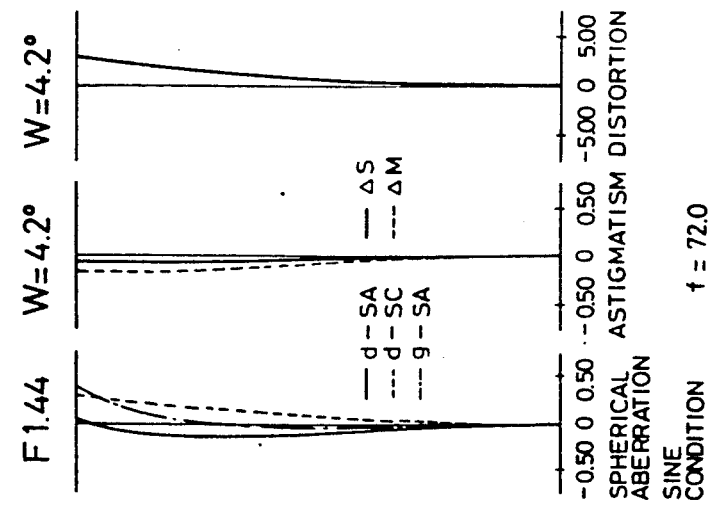
Figure 5B:
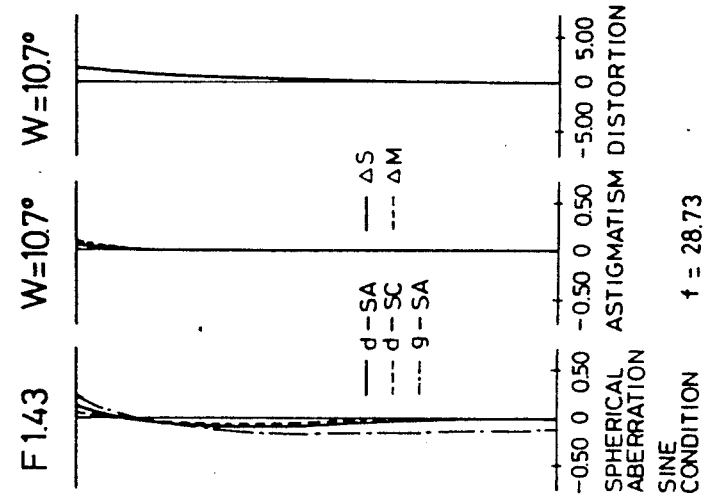
Figure 5C:
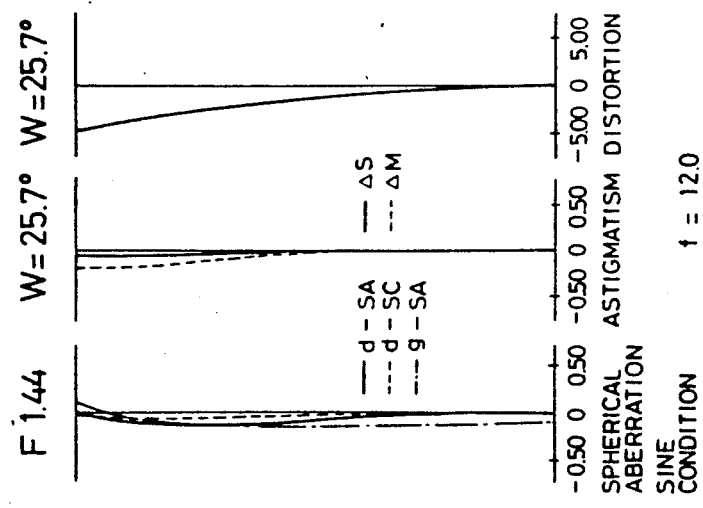

Aberration curves of the embodiments including an optical compensation glass are shown in FIGS. 2 to 9. As will be apparent from these aberration curves, an extremely compact zoom lens, which is well compensated in aberration, having a tele-ratio of approximately 1.71 to 1.70 was obtained by the present invention.

What is claimed is:

1. A zoom lens comprising, successively from an object side, a first lens unit having a positive refracting power, a second lens unit having a negative refracting power, a third lens unit having a negative refracting power, a fourth lens unit having a positive refracting power, and a fifth lens unit having a positive refracting power with a stop sandwiched therebetween, said first lens unit comprising a lens unit for focusing consisting of a cemented lens of a first negative lens and a second positive lens and a third positive meniscus lens, said second lens unit comprising a lens unit consisting of a fourth negative lens and a cemented lens of a fifth negative lens and a sixth positive lens, said lens unit being moved as zooming takes place to vary a focal length, said third lens unit comprising a lens unit consisting of a seventh negative lens for principally maintaining a focal position constant by movement thereof as zooming takes place;

said fourth lens unit comprising a lens unit consisting of two positive eighth and ninth lenses for compensating a divergent luminuous flux emitted from a zoom system composed of said first, second and third units into a bundle of rays or a gently converging luminous flux, said fifth lens unit comprising a lens group for focusing comprising a front component consisting of a positive tenth lens, a positive eleventh meniscus lens and a negative twelfth lens and a rear component consisting of a negative thirteenth lens, a positive fourteenth lens and a positive meniscus fifteenth lens, said zoom lens being satisfied with the following conditions:

$$4.2 F_w < F_I < 4.9 F_w$$
$$3.4 < F_I/|F_{II}| < 4.0$$

$$0.98 < |F_{II}|\left(\frac{n_4 - 1}{r_7} + \frac{n_5 - 1}{|r_8|}\right) < 1.15$$

$$2.45 F_w < F_V < 2.85 F_w$$
$$1.6 F_V < f_1 < 2.2 F_V$$
$$0.14 f_1 < d_{22} < 0.2 f_1$$

$$\frac{n_8 + n_9}{2} < 1.7$$

$$1.75 < n_{12}$$

$$55 < \frac{\nu_8 + \nu_9}{2}$$

$$\nu_{12} < 27$$

where
$F_w$: Shortest focal length of the entire system
$F_I$: Focal length of the first lens unit
$F_{II}$: Focal length of the second lens unit
$F_V$: Focal length of the fifth lens unit
$r_7$: Radius of curvature of a surface on the image side of the fourth lens
$r_8$: Radius of curvature of a surface on the object side of the fifth lens
$n_i$: Refractive index of the i lens
$\nu_i$: Abbe's number of the i lens
$f_1$: Focal length of the front component of the fifth lens unit
$d_{22}$: Spacing between the negative 12th lens and the negative 13th lens.

* * * * *